United States Patent Office 3,151,507
Patented Oct. 6, 1964

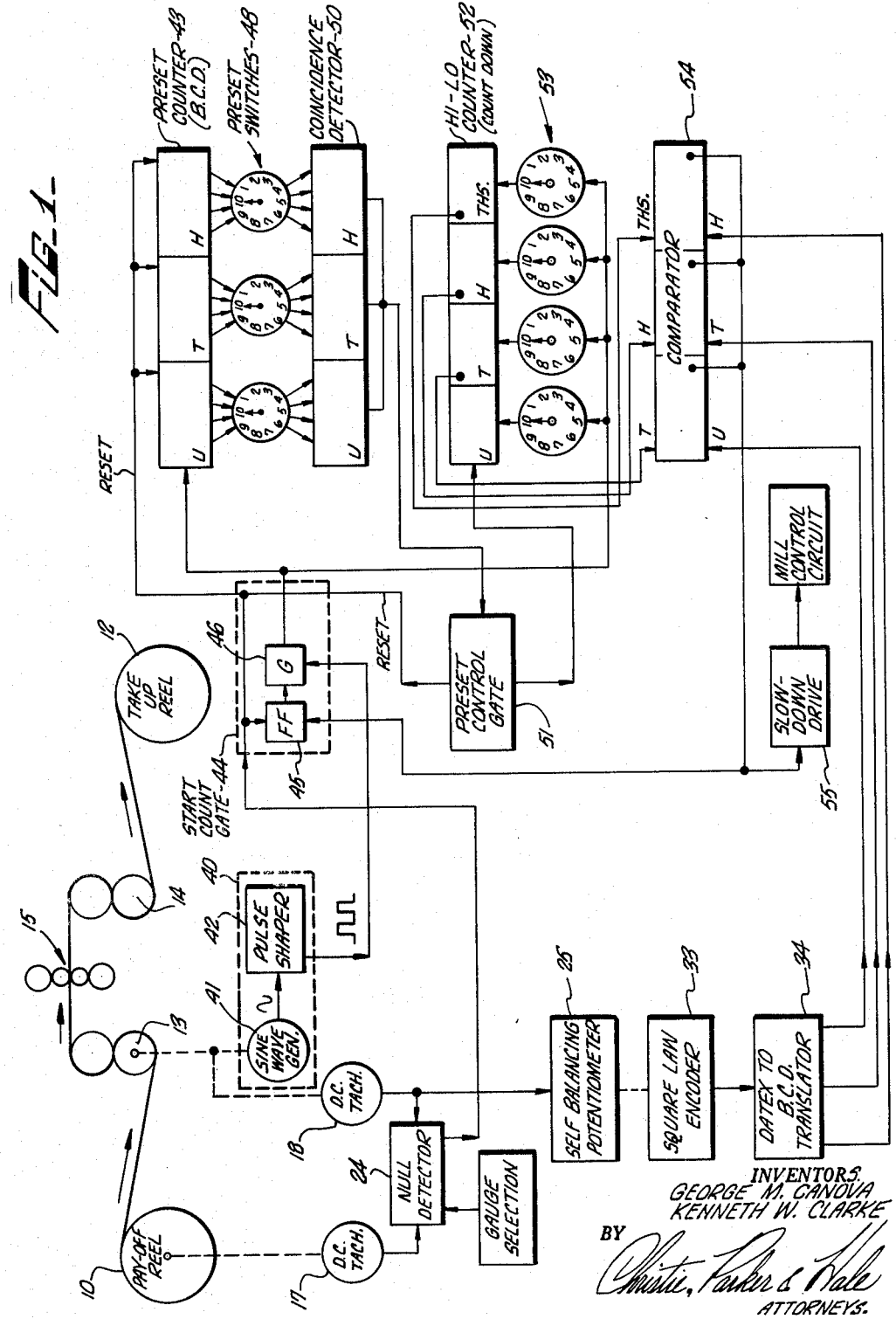

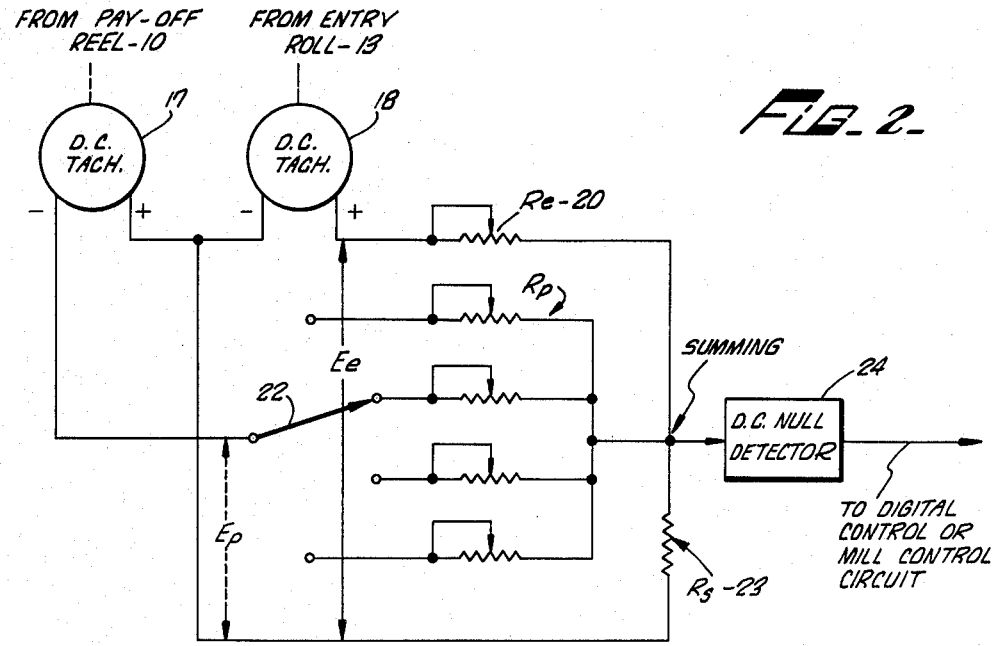
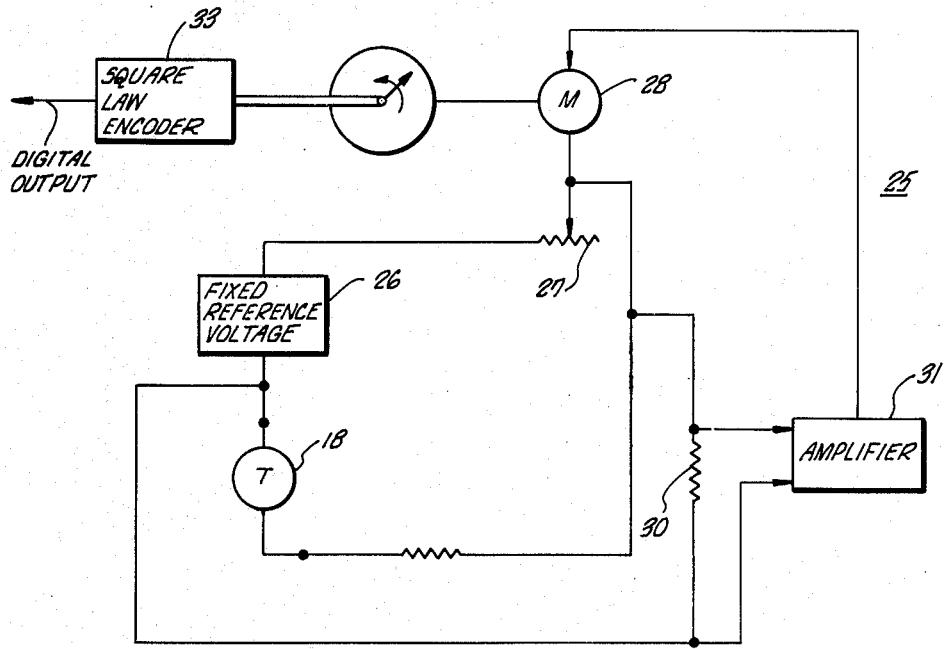

3,151,507
SPEED CONTROL SYSTEM
George M. Canova, Duarte, and Kenneth W. Clarke, Arcadia, Calif., assignors to Datex Corporation, Monrovia, Calif., a corporation of California
Filed May 23, 1961, Ser. No. 112,072
5 Claims. (Cl. 80—32)

This invention relates to a speed control system and, more particularly, to an analog-digital speed control circuit. In one disclosed embodiment, the speed control system is utilized to slow down the transport rate of a steel strip passing through a reduction mill.

In the manufacture of strip material it sometimes becomes necessary to transport the material from one plant location to another or to perform a certain operation on the material as it is being transported. In a steel mill, for example, a steel strip of a certain gauge or thickness may be transported from one location to another location and have its gauge reduced during the transit. During this reduction in thickness, the transporting rate is adjusted for maximum production, however, when the tail end of the steel is being approached it is necessary to reduce the mill speed to prevent hazard to the machinery and mill operating personnel. At the present time, in many mills the speed control signal is manually initiated by an operator and the time of actuating a "slow-down" is largely dependent upon the skill and experience of the operator. The moment of actuating the slow-down signal, therefore, is a factor in maintaining maximum production. It is therefore desirable to provide a simple yet reliable speed control system that will allow maximum production rates to be maintained and yet provide the desired slow-down signal under various transport speeds.

The present invention provides an improved, self-calibrating speed control system for automatically initiating a slow-down signal particularly adapted for variable speed mills and yet maintaining maximum production rates. The control system automatically actuates the slow-down signal, without counting or calculating the total amount of strip material transported, to allow equal lengths of the strip material to be transported at "exit" speeds without requiring any adjustments for the actual mill speed.

Structurally, the speed control system utilizes a combination of analog and digital techniques for controlling the instant of time when the slow-down signal is to be applied to the mill. The analog portion of the system is responsive to the speed signals corresponding to the speed of a material pay-off reel and to the speed of an entry roll for the mill and when the two speed signals have a predetermined relationship correlated to the amount of strip remaining on the pay-off reel, a control signal is initiated for generating a slow-down signal. When the mill is a constant speed mill, this control signal may function as the slow-down signal. However, since most mills are variable speed mills, the control signal actuates the digital portion of the system to produce a delay in the time at which the slow-down signal is applied. This is necessary since the control system is initially calibrated in terms of the maximum mill operating speed. The digital control arrangement then compensates for the amount of strip transported while decelerating from actual mill speed to the slow-down or "exit" speeds. The entry roll is further arranged with a pulse generator for producing pulses at a rate proportional to the speed of the entry roll and are counted by a preset counter. The preset counter is actuated only after the control signal has been generated and, therefore, the counter counts the amount of material that passes over the entry roll only after the occurrence of the control signal. The preset counter is further arranged to emit a pulse for each predetermined length of strip passing over the entry roll and which output pulse may be termed a "footage" pulse. The "footage" pulses, in turn, are applied to a count-down pulse counter and which pulse counter has a count recorded therein corresponding to the maximum number of feet of strip remaining on the pay-off reel at the moment that the control signal is generated. The speed control generating means is further arranged with a self-balancing potentiometer means to provide a continuous measure of the actual mill speed and further includes means for automatically generating a binary coded output signal proportional to the square of the actual mill speed. This latter binary coded output signal is compared with the count recorded in the count-down counter and when the counter reaches this binary coded output indication the slow-down signal is generated and therefore the predetermined amount of steel will be transported at the reduced rate or "exit" speed.

These and other features of the present invention may be more fully appreciated when considered in the light of the following specification and drawings, in which:

FIGURE 1 is a schematic representation of a speed control system embodying the invention;

FIGURE 2 is a speed comparing arrangement for the system of FIG. 1; and

FIGURE 3 is a self-balancing arrangement for producing a digital output indication proportional to the square of the system speed for the system of FIG. 1.

The invention will be described in terms of a reduction mill for processing steel strip although it should be understood that the invention is applicable for controlling the speeds for any mill or the like wherein strip material is transported from one location to another. In general, in a reduction mill the steel strip is stored on a rotatable reel identified as a pay-off reel 10 and is transported to a take-up reel 12 by means of a plurality of entry and exit rolls 13 and 14 spaced on opposite sides of reduction rolls 15. The strip material is stored on the pay-off reel 10 and, as it is transported therefrom by means of the entry roll 13, has its thickness reduced by means of the reduction rolls 15 and is then guided by means of the exit rolls 14 for restorage on the take-up reel 12. The entry and exit rolls 13 and 14 are rotatably responsive to the advancement of the strip material and are rotated at a rate directly proportional to the transport rate of the strip. It should be noted that the rotative speed of the pay-off reel 10 varies in accordance with the amount of steel stored thereon and the gauge or thickness of this stored steel. Therefore, depending upon the amount of steel stored on the pay-off reel 10, the pay-off reel will rotate at a lower or higher speed than the entry roll 13. It should also be recognized that the amount of strip that is transported or advanced when the strip is decelerating from a high speed, "run" speed, to an "exit" speed that the amount of strip paid out will vary as a function of the square of the speed of the entry rolls 13.

Before discussing the speed control system proper, the arrangement that may be utilized for producing a slow-down signal when the mill is operated at a constant speed and which arrangement is also incorporated into the speed control system for mills operating at variable speeds will first be examined. The pay-off reel 10 is coupled through suitable gearing or the like to drive a direct current tachometer 17 that produces a direct current output voltage proportional to the speed of the pay-off reel 10. In the same fashion, a similar direct current tachometer 18 is coupled to the entry roll 13 to produce a speed signal. During the normal mill operation the entry roll 13 will rotate at a substantially constant speed and, therefore, the output voltage produced by the direct current tachometer 18 will be at a substantially constant level. On the other hand, the speed of the pay-off reel 10 will vary with the amount of strip stored thereon and, therefore, the output voltage from the tachometer 17 is a continuously varying voltage. These voltages are coupled into a voltage comparison arrangement with the tachometer voltages arranged with opposing polarities and applied to a resistance impedance summing network. The output voltage from the entry roll tachometer 18 may be applied through a variable resistor Re, further identified by the reference character 20; see FIG. 2. The output voltage from the pay-off tachometer 17 is connected with one of a plurality of resistors Rp by means of a selector switch 22. The selector switch 22 is connected to the negative terminal of the direct current tachometer 17 and places a selected one of the resistors Rp in circuit relationship with the resistor Re and the pair of resistors are, in turn, coupled to the same terminal of a summing resistor Rs, further identified by the reference character 23. The common junction or summing junction for this pair of resistors, Re and Rp, is coupled to a direct current null detector 24 which detects when the two voltages Ee and Ep bear the same ratio to each other as the resistors Re and Rp bear to each other and provides an output indication thereof. The direct current null detector 24 may take the form of any well known null detector that provides an output indication or voltage when the desired ratio of voltages is indicated. One direct current null detector that has been employed is the West-Amp Model 202 direct current null detector commercially available from West-Amp, Inc. of Los Angeles, California.

The plurality of resistors Rp are arranged in a parallel circuit relationship and each resistor is calibrated to represent a particular strip thickness or steel gauge. Since it is desired to actuate the slow-down signal when the same amount of strip length remains on the pay-off reel for various operating conditions rather than when the pay-off reel 10 and entry roll 13 have the same speeds, it is necessary to compensate for the various strip thicknesses or steel gauges. This is necessary since the comparison arrangement described basically functions on the basis of equal diameters for the pay-off reel 10 and the entry roll 13. However, when the diameters are equal, the amount of strip length remaining on the pay-off reel 10 will be greatly different depending upon the thickness of the gauge since these speeds indicate that the diameter of the pay-off reel 10 and the entry roll 13 are equivalent rather than indicating the desired amount of strip remaining on the pay-off reel 10. Therefore, the resistors Rp are calibrated in accordance with the various gauges of steel that the mill will normally handle and, in one practical embodiment, the resistors Rp are calibrated to handle strip gauges in steps of .001 inch. The particular steel gauge that is stored on the pay-off reel 10 is selected by means of the selector switch 22 and, therefore, when the voltages generated by the tachometers 17 and 18 produce a null, as indicated by the detector 24, an output signal is generated indicating that the desired amount of steel or "tail" remains on the reel 10. This control signal may be applied directly to the mill control circuit to cause the mill to slow down to the desired "exit" speed when the mill is a constant speed mill. When the mill is a variable speed mill, this signal is applied to the digital portion of the speed control system.

Now referring to the self-balancing potentiometer arrangement 25 of FIG. 3, it will be described as it is utilized in the speed control system. The self-balancing potentiometer is initially calibrated in terms of the maximum mill operating speed or a speed slightly greater than the maximum operating speed and, once calibrated for this speed, will automatically adjust to the actual mill speed. Therefore, once the speed control system is set up, it will automatically and continuously adjust itself to provide a digital output indication corresponding to the actual mill speed. A self-balancing potentiometer having the desired characteristics for incorporation in the instant speed control system is commercially available from Leeds & Northrop Co. of Philadelphia, Pennsylvania and, in particular, the arrangement identified as their Speedomax H instrument has been successfully utilized.

The schematic arrangement of FIG. 3 will suffice to make the operating principle of the self-balancing arrangement clear for the purposes of this invention. The potentiometer arrangement is essentially a null seeking balance arrangement which includes a fixed reference voltage 26 arranged in series circuit arrangement with a voltage undergoing measurement, in this instance the output voltage provided by the entry roll tachometer 18. The output of the fixed reference voltage 26 is coupled through an adjustable resistor 27 which is adjusted by means of a movable arm controlled by a balancing motor 28 arranged in a well-known fashion. The output voltage from the tachometer 18 is compared with the fixed reference voltage 26 by means of the resistor 30 and any difference or error voltage is detected and amplified by an electronic amplifier 31 utilized to drive the balancing motor 28 in the correct direction towards balance. When the output voltage of the tachometer 18 and the reference voltage 26 are equal, the motor 28 will be de-energized and the potential derived from the resistor 27 will become fixed and equal to the tachometer voltage representative of mill speed. Generally, the shaft for the motor 28 has coupled thereto an indicator that rotates therewith. The shaft of the motor 28 then can be considered to produce a shaft angular position that is directly proportional to the mill speed and the indicator mounted thereon can be calibrated in terms of mill speed. The structure for the self-balancing arrangement discussed hereinabove is the conventional Leeds & Northrop instrument.

To produce a digital output indication from such a self-balancing arrangement, the instrument is modified by including a shaft position digitizer or encoder coupled to be driven by the balancing motor 28 so that the shaft of the encoder 33 will also rotate through an angle proportional to mill speed. The encoding disc has a pattern recorded thereon in terms of the square of the actual mill speed since the amount of strip material transported during a deceleration from mill speed to "exit" speed varies as the square of the speed of the entry roll 13. The square law encoder 33, therefore, will have a conventional linear pattern but arranged in a non-linear fashion to produce a digital output having a square law characteristic.

An encoder whose digital output is proportional to the square of its input shaft rotation can be constructed with the following considerations in mind. If the total angular rotation of the encoder input shaft is denoted as $\theta_{max}$ and the digital output of the encoder at $\theta_{max}$ is $N_{max}$, then when the angular rotation of the encoder for any given output or count N is denoted as $\theta$, the angle from zero to the beginning of any count can be defined by Equation 1 as follows:

$$(1) \qquad \theta = \frac{\theta_{max}}{\sqrt{N_{max}}} \sqrt{N}$$

The values of $\theta$ obtained for each N, denoted as $\theta_N$, can be computed from Equation 1 and tabulated as follows:

| N | $\theta_N$ (degrees–minutes–seconds) | $\theta_{N+1} - \theta_N$ |
|---|---|---|
| 0 | 00 00 00 | 14 29 20 |
| 1 | 14 29 20 | 05 41 10 |
| 2 | 20 10 30 | 04 55 20 |
| 3 | 25 05 50 | 03 34 00 |
| * | * | * |
| 499 | 323 21 30 | 00 38 30 |
| 500 | 324 00 00 | 00 38 30 |

Each of the values of $\theta$, then, can be marked off on a circular pattern starting from an arbitrary reference point, 0 degrees. The angular distance between successive values of $\theta_N$, denoted $\theta_{N+1} - \theta_N$, is shown in column three. Note that $\theta_{N+1} - \theta_N$ decreases as N increases due to the non-linearity of the function.

The actual digital pattern for the shaft position digitizer disc can be defined in terms of a Datex Code such as is described and claimed in the co-pending application of Carl P. Spaulding entitled Digital Coding and Translating System bearing Serial No. 415,058, a filing date of March 9, 1954 and assigned to the same assignee as the present invention. For use in the present invention, the digital output in terms of the Datex Code must be translated to the binary coded decimal arrangement and, for this purpose, a translator constructed in accordance with the following logic must be provided in order to produce the desired comparison and output indication.

*Table I*

| Decimal | Datex Code | | | | BCD Code | | | |
|---|---|---|---|---|---|---|---|---|
| | A | B | C | D | 8 | 4 | 2 | 1 |
| 0 | X | 0 | 0 | 0 | 0 | 0 | 0 | 0 |
| 1 | X | X | 0 | 0 | 0 | 0 | 0 | X |
| 2 | 0 | X | 0 | 0 | 0 | 0 | X | 0 |
| 3 | 0 | X | X | 0 | 0 | 0 | X | X |
| 4 | 0 | 0 | X | 0 | 0 | X | 0 | 0 |
| 5 | 0 | 0 | X | X | 0 | X | 0 | X |
| 6 | 0 | X | X | X | 0 | X | X | 0 |
| 7 | 0 | X | 0 | X | 0 | X | X | X |
| 8 | X | X | 0 | X | X | 0 | 0 | 0 |
| 9 | X | 0 | 0 | X | X | 0 | 0 | X |

The Datex Code is translated to the binary coded decimal or 8–4–2–1 notation in accordance with the following logical arrangement:

$$1 = \bar{D}[B(A+C)] + D[\overline{B(A+C)}]$$
$$2 = \bar{A}B$$
$$4 = \bar{A}(\bar{B}+D)$$
$$8 = AD$$

wherein "+" is representative of a logical OR circuit and the juxtaposed elements are representative of a logical AND circuit. The unbarred outputs refer to the true values of the binary bits, or as shown in Table I, the "X" values, while the barred outputs, i.e., $\bar{A}$; represent the false or zero values.

Now referring to FIG. 1 the structural organization of the speed control system will be described. In addition to the direct current tachometer 18 the entry roll 13 is provided with a pulse generator 40 which comprises a sine wave generator 41 coupled to a pulse shaper 42 to produce pulses at a rate proportional to the speed of the entry roll 13. The sine wave generator 41 may be in the form of a Beckman/Berkeley Model 466 generator that produces 180 sine waves per input shaft revolution. This sine wave output is applied to the pulse shaper 42 which converts the sine wave to a square wave or pulse form for use in the digital calibrating portion of the speed control system. The output pulses from the pulse shaper 42 of pulse generator 40 are coupled to a preset counter 43 by means of a start-count gate 44. The preset counter 43 is a conventional flip-flop binary counter and is arranged to produce a binary coded decimal output indication in terms of the 8–4–2–1 notation. The preset counter 43 illustrated comprises three decades for the units, tens, and hundreds with each decade counting in the 8–4–2–1 notation.

The application of the pulses from the pulse generator 40 to the preset counter 43 is controlled by the start-count gate 44. The start-count gate comprises a flip-flop circuit 45 having a conventional coincident gating arrangement 46 connected to the output thereof. The output of the null detector 24 is coupled directly to the input of the flip-flop circuit 45 for the start-count gate 44 and is adapted to switch the state of the flip-flop 45 upon the detection of the desired speed relationships between the tachometers 17 and 18, as described hereinabove. This same control signal is coupled by means of the start-count gate 44 to each of the decades of the preset counter 43 to reset them to zero. The output of the flip-flop 45 coupled to the gate 46 also conditions this gate to accept and produce an output indication corresponding to each pulse received from the pulse generator 40 and thereby causes the preset counter 43 to count each of these generated pulses in a conventional fashion.

The counter 43 is manually set by means of the preset decimal switches 48 and which switches are of conventional design providing 8–4–2–1 output indication of the decimal setting. The switches are set up to indicate a desired resetting count for the preset counter 43 in terms of the decimal system and produce the binary coded decimal output setting signals for comparison with the pattern of signals generated by the counter 43. When one of the decades of the preset switches 48 indicate the same decimal digit as the corresponding decade of the counter 43, a series circuit is established through the switch. When each of the decades of the counter 43 and switches 48 agree, this condition is sensed by a coincidence detector 50 which provides an output indication that the counter has reached the preset value.

The value preset into the switches 48 is selected whereby the number of pulses counted by the counter 43 represents a predetermined length of material transported past the entry roll 13. For the purposes of this invention, the predetermined length of steel strip is a foot of strip and, therefore, the preset counter is adapted to count and emit a single output pulse by means of the coincidence detector 50 for each foot of steel passed by the entry roll 13. These output pulses may be termed "footage" pulses.

The output of the coincidence detector 50 is applied to a preset count gate 51 and which preset count gate provides a pair of output signals in response to the coincidence signal provided by the detector 50. The preset count gate in one embodiment of the invention comprises a transistor amplifier coupled to receive the coincidence signal and, in turn, provides the amplified signal to a monostable multivibrator or one-shot circuit arrangement. A pair of output signals are derived from each half of the monostable multivibrator. The normally de-energized stage of the monostable multivibrator has its output signal coupled to the start-count gate 44 in common with the control or null signal and functions to reset each of the decades of the counter 43 to zero at the end of each "footage" pulse to allow the counter to count the next group of pulses corresponding to the next foot of steel. The other output from the preset count gate 51 is coupled to a count-down counter 52, further identified as a Hi-Lo counter. This latter-mentioned output indication is representative of the "footage" pulses and is applied to the units decade of the counter 52. The Hi-Lo counter 52 functions to count down the "footage" pulses provided by the preset counter 43.

Preset switches 53 substantially similar to the switches 48 are utilized to set the counter 52 to a preselected count, or the "Hi" count. In terms of the speed control system, the high count corresponds to the length of strip material remaining on the pay-off reel 10 at the time that the null or control signal is provided when the mill is operating at substantially maximum speed. This number is therefore set up on the decimal switches 53 and subsequently transferred into the Hi-Lo counter 52. This transfer is effected by means of the first pulse applied to the preset counter 43 being coupled to the common terminal of each of the decades for switches 53. The output signals for each decade of the switches 53 is in terms of the 8–4–2–1 notation and are defined to correctly set the counter 52 to the decimal setting of switch 53. It should be noted that the Hi-Lo counter 52 comprises four decades identified as the units, tens, hundreds, and thousands decades and is generally similar in structure to the preset counter 43. The circuitry differs in that the counter counts down or a count is subtracted from the count set into the counter 52 by means of the switches 53 with the reception of each "footage" pulse. The low count for the Hi-Lo counter 52 is the count indicated as the digital output of the square law encoder 33 discussed hereinabove. The slow-down signal is to be initiated when the count registered by the Hi-Lo counter 52 is the same or substantially the same as the count indicated for the digital output of the square law encoder 33.

The output of the Hi-Lo counter 52 therefore is compared with the output of the square law encoder 33 translated in terms of the 8–4–2–1 binary coded decimal notation in a binary comparator 54. The binary comparator 54 functions in the usual fashion to compare bit by bit each bit of the two numbers starting with the highest bit and proceeding to the lowest bit. In general, the number of decades or decimal digits for the square law encoder 33 and the Hi-Low counter 52 should be the same for the greatest accuracy. However, the encoder construction can be simplified if a little less accuracy can be tolerated by dividing the output of the encoder by ten and then employing the hundreds digit from the encoder for comparison with the thousands digit of the Hi-Lo counter 52 and, in the same fashion, comparing the tens and hundreds encoder bits with the units and tens bits of the counter and ignoring the units digit for the Hi-Lo counter 52. This simpler encoder construction therefore will render the arrangement a little less accurate but will be ±10 feet of the actual slow-down distance.

The comparator 54, therefore, is constructed so that when the three decades of the encoder and the Hi-Lo counter 52 are compared and each are equal bit by bit, an equality output signal is provided and is coupled to the slow-down drive circuit 55 as well as the flip-flop 45 for the start-count gate 44. The flip-flop 45 is reset in this fashion and prevents the further counting of the pulses from the generator 40 after the slow-down point has been reached. The slow-down drive circuit 55 generates the necessary slow-down signal which may be in terms of a contact closure for the mill control circuit to initiate the deceleration from mill speed to "exit" speed. The mill control circuit is a conventional speed control circuit as employed in present day mills for controlling the motors for the pay-off reel 10, take-up reel 12, and reduction rolls 15. The slow-down signal, then, provides the intelligence to this conventional control circuit by means such as the aforementioned contact closure to cause the motor controllers to place the associated motors at "exit" speed.

The operation of the speed control system of FIG. 1 can be best described in terms of an example for a particular rolling mill. It will be assumed that ten different gauges of steel strip can be rolled on this mill and the gauges may vary from .001 inch to .010 inch. Therefore, ten resistors $Rp$, each calibrated for one of these gauges, are required. Equation 2 below must be solved for each value of gauge, or $g$, in steps of .001 inch for each of the above noted values:

$$(2) \qquad Rp = Re\left(\frac{NpDe}{Ne\sqrt{15.3\,Lg+d^2}}\right)$$

wherein $Rp$ represents the resistance of the input summing resistor in ohms, $Np$ represents the gearing (if any) between the pay-off reel 10 and the direct current tachometer 17, $De$ represents the diameter of the entry roll 13, $Ne$ represents the gearing (if any) between the entry roll 13 and the direct current tachometer 18, $L$ represents the length of steel in feet on the pay-off reel 10 at the time of a control or null signal, $g$ equals the gauge of the steel in inches, and $d$ is the instantaneous diameter in inches of the pay-off reel 10 (the hub diameter). It should be noted that once the numerical values for this equation have been determined, $g$, or the steel gauge, is the only quantity that changes.

It will be further assumed that both direct current tachometers 17 and 18 are identical and are geared to their respective rolls through identical gearing to produce approximately .006 volt per revolution. The pay-off reel hubs and the entry roll diameters will be considered to be 24 inches so that $De$ equals 24.00 and $d$ equals 24. The maximum speed will be considered to be 6,000 feet per minute, or $V=7.2\times10^4$ inches per minute. The maximum length of strip that can be paid out during slow-down when the system is operating at maximum speed is 5,000 feet, so that $L=12\times5,000$ inches, or $L=6\times10^4$ inches. The value for $Re$ or resistor 20 can be chosen arbitrarily subject only to the condition that it be large enough to avoid degrading the linearity of the direct current tachometer. $Rp$ in this example can be a 100,000 ohm variable resistor.

Equation 2 can then be solved for each value of gauge from $g=.001$ to $g=.010$ inch to yield ten different values of $Rp$. Each resistor $Rp$, therefore, will be set to the value calculated in accordance with the solution afforded by Equation 2. The selector switch 20 may then be operated to select the particular $Rp$ corresponding to the actual gauge of steel stored on the pay-off reel 10.

The high setting for the Hi-Lo counter 52 will correspond to the maximum length of strip that remains on the pay-off reel 10 when the null signal is generated, and, in accordance with the example, will be 5,000 feet. The thousands unit of the decade setting switch 53 will then be rotated to indicate the decimal five while the remaining units will be set to zero to record the number 5,000.

The remaining calculation to be performed prior to the actual mill operation is the calculation of the setting for the preset switches 48. The number entered into the preset counter 43 is calculated in accordance with Equation 3 below:

$$(3) \qquad P = kN_e\left(\frac{12}{\pi D_e}\right)$$

pulses per revolution wherein $N_e$ and $D_e$ are as defined hereinabove, P equals the number to be manually entered by means of the preset switches 48 into the preset counter 43, and $k$ equals the pulses per revolution produced by pulse generator 40. Assuming that the pulse generator 40 produces 180 pulses per revolution so that $k=180$ and with the above dimensions also substituted into Equation 3, P will be calculated to be 115 and, therefore, the preset switches 48 will be set to the decimal number 115. It should also be noted, however, that the entry roll diameter $D_e$ is subject to wear and frequent replacement, hence the value of $D_e$ should be checked often to assure best accuracy of the speed control system.

With the above structure in mind and assuming that the mill is operating below its maximum speed, it will be assumed that the correct value of resistor $Rp$ has been selected by means of the selector switch 22 for the gauge to be transported through the mill. The preset switches 48 and the decade setting switches 53 are set to their proper value in accordance with the calculations derived by means of the Equations 2 and 3. It should also be recognized that with the mill operating below its maximum speed the digital output of the square law encoder 33 will automatically indicate the correct low count to which the Hi-Lo counter 52 must be counted before a slow-down signal is initiated. With the system in operation and the strip material being transported from the pay-off reel 10 to the take-up reel 12, the direct current tachometers 17 and 18 will provide the speed signals corresponding to the speeds of the pay-off reel 10 and the entry roll 14, respectively. During this interval the pulse generator 40 will also be operative to provide pulses at a rate proportional to the speed of the entry roll 13. These pulses, however, are not coupled to the preset counter 43 since the flip-flop 45 has been set in a state to disable the gate 46. As the amount of strip paid off from the pay-off reel 10 approaches the time when the slow-down signal should be applied, the voltages generated by the tachometers 17 and 18 approach one another. Of course the voltage from the direct current tachometer 17 has been modified for the gauge of steel being transported from the pay-off reel 10 and further modification of these voltages to produce the desired speed ratio between the pay-off reel 10 and the entry roll 13 may be indicated by a null and which null is detected by means of the direct current null detector 24.

When the desired speed relationship has been reached, the direct current null detector 24 will provide an output indication to the flip-flop 45 of the start-count gate 44. This control null signal will switch the state of the flip-flop 45 and enable the gate 46 to allow the pulses from the pulse generator 40 to be applied to the preset counter 43 immediately after the counter has been reset to zero by this same null signal. The first count pulse will also be effective to transfer the decimal digit 5,000 set up in the switches 53 into the Hi-Lo counter 52. Therefore, the pulses from the generator 40 will be counted by preset counter 43 until the number 115, set into the preset switches 48, is reached and which number corresponds to a foot of steel having passed the entry roll 15. When 115 pulses have been counted, the coincidence detector 50 will provide an output indication to the present count gate 51. With the arrival of the coincidence pulse at the preset count gate 51, the output signal therefrom resets the preset counter 43 to zero to allow it to count the pulses representative of the next foot of steel and simultaneously causes the first "footage" pulse to count down the counter 52 or subtract one from the 5,000 count recorded therein. This operation continues with the preset counter 43 counting off the "footage" pulses and the Hi-Lo counter 52 being counted down until the count of the Hi-Lo counter 52 is equal to the digital output produced by the square law encoder 33, or when the three most significant digits of the Hi-Lo counter 52 are equal to the encoder digits, as indicated by the comparator 54. When an equality signal is provided by the comparator 54, a slow-down signal is generated by the slow-down drive 55 for application to the mill control circuit. At this same time the flip-flop 45 is reset to prevent the generation of further "footage" pulses and the slow-down signal is applied to the mill control circuit to cause the mill to go from mill speed to "exit" speed at the time when the correct amount of strip remains on the pay-off reel 10.

It is therefore clear that the present invention provides an improved speed control arrangement for controlling the time of slow-down of a mill. The timing of the slow-down signal is automatically computed so that the mill slows from maximum speed or any other running speed to "exit" speed while maintaining maximum production rates.

What is claimed is:

1. In a control arrangement including first and second rotatable reels adapted for transporting strip material therebetween; a rotatable roller arranged adjacent to one of said reels and rotatably responsive to the transport speed of the strip material; means coupled to said one reel for generating a signal proportional to the reel speed; means connected to be responsive to the speed signals for comparing same and providing an output signal when the speeds have a preselected relationship; said latter means including selectable impedaance means calibrated in accordance with the various thicknesses of strip material to be transported; and digital control means connected to be actuated by said output signal to provide a speed control signal a preselected time interval after the occurrence of the output signal; said digital control means including pulse generating means coupled to said roller for providing pulses at a rate proportional to the speed of said roller, pulse counting means connected to be controlled by said output signal to count off the generated pulses and to provide a binary coded output indication of the number of feet of material that have been transported past said roller after the occurrence of said output signal, self-balancing potentiometer means connected in circuit relationship with said roller speed signal and providing a binary coded output indication proportional to the square of the actual transport rate of the strip material, and control circuit means including means for comparing the binary coded output signals from said potentiometer means and said pulse counting means for providing a slow-down signal upon the signals having a predetermined relationship, and control apparatus for controlling the speeds of said first and second reels and connected to be responsive to the slow-down signal for reducing the mill running speed.

2. In a mill having a first rotatable reel for storing strips of material, a second rotatable reel for receiving the strip from said first reel, at least a single rotatable roll spaced intermediate said first and second reels, means coupled to said first reel for providing an electrical signal proportional to the reel speed, means coupled to said single roll for providing an electrical signal proportional to the roll speed, means connected to be responsive to each of said speed signals for providing a control signal when said reel and roll speeds have a preselected relationship relative to the maximum mill speed, means coupled to said single roll for providing electrical pulses proportional to the roll speed, first pulse counting means, counting control means coupled to said counting means and connected to be responsive to said roll pulses and to said control signal to allow the pulses to be counted only after the arrival of the control signal, first selector means coupled to said counting means for presetting the counting means to cause same to provide an output pulse for each predetermined length of strip passing over said roll, second pulse counting means, second selector means for causing the second counting means to assume a predetermined count dependent on the maximum mill speed, means for coupling the output pulses from said first counting means to said second counting means to count down the latter, self-balancing means coupled to the speed generating means of said roll for providing a binary coded output signal defined relative to the mill running speed, means for comparing said binary coded signal with the count of said second counting means for providing a mill slow-down signal when said signals are substantially the same, and control apparatus for controlling the speeds of said first and second reels and connected to be responsive to the slow-down signal for reducing the mill running speed.

3. In a rolling mill having a rotatable pay-off reel for storing steel strip and a take-up reel for receiving the steel strip from the pay-off reel, at least a single entry roll arranged intermediate said reels, means coupled to said pay-off reel for generating an electrical signal proportional to the speed of the pay-off reel, means coupled to said entry roll for generating an electrical signal proportional to the speed of the entry roll and thereby the mill speed, means connected to be responsive to the speed signals for comparing same to provide a control signal when a predetermined amount of steel strip remains on the pay-off reel, said latter means including a plurality of manually selectable impedance devices calibrated for different gauges of steel and adapted to be individually connected into the comparing means, the comparing means being further defined in relation to the maximum rolling mill speed, pulse generating means coupled to be responsive to the rotation of said entry roll and thereby providing pulses at a rate proportional to actual mill speed, means for counting the generated pulses in accordance with the amount of steel passed by said entry roll, means coupled to said pulse counting means for storing a count therein corresponding to said predetermined amount of steel strip remaining on the pay-off reel, self-calibrating means coupled to be responsive to the speed of the entry roll and thereby the actual mill speed and providing a binary coded output indication thereof proportional to the square of the actual mill speed, and binary comparison means connected to be responsive to the output indication of said counting means and said binary coded output indication for generating a slow-down signal when said counter output and said binary coded output indication have a preselected relationship, and control apparatus for controlling the speed of the mill including the pay-off and take-up reels and connected to be responsive to the slow-down signal for reducing the mill running speed.

4. In a mill having a first rotatable reel for storing strips of material, a second rotatable reel for receiving the strip from said first reel, at least a single rotatable rolls spaced intermediate said first and second reels, tachometer means coupled to said first reel for providing an electrical signal proportional to the reel speed, tachometer means coupled to said single roll for providing an electrical signal proportional to the roll speed, null detector means connected to be responsive to each of said speed signals for providing a control signal when said reel and roll speeds have a preselected relationship, means coupled to said single roll for providing electrical pulses proportional to the roll speed, pulse counting means, means coupled to said counting means to cause same to assume a predetermined count dependent on said preselected speed relationship, self-balancing means coupled to the speed generating means of said roll for providing a digital output signal corresponding to the square of the mill running speed, means for comparing said digital signal with the count of said counting means for providing a mill slow-down signal when said signals are substantially the same, and mill speed control means connected to be responsive to the slow-down signal for reducing the mill running speed by reducing the speed of said first and second reels.

5. In a rolling mill having a rotatable pay-off reel for storing steel strip and a take-up reel for receiving the steel strip from the pay-off reel, at least a single entry roll arranged intermediate said reels, means coupled to said pay-off reel for generating an electrical signal proportional to the speed of the pay-off reel, means coupled to said entry roll for generating an electrical signal proportional to the speed of the entry roll and thereby the mill speed, means connected to be responsive to the speed signals for comparing same to provide a control signal when a predetermined amount of steel strip remains on the pay-off reel with the mill operating at substantially maximum speed, said latter means including a plurality of manually selectable impedance devices calibrated for different gauges of steel and adapted to be individually connected into the comparing means, pulse generating means coupled to be responsive to the rotation of said entry roll and thereby providing pulses at a rate proportional to actual mill speed, preset counting means for providing an output pulse for each foot of steel passed by said entry roll, means coupled to said counting means for presetting the counter to cause same to emit an output pulse for each foot of transported steel, preset counting control means coupled to be responsive to said pulse generator and to said control signal to allow the pulses to be counted only after the arrival of the control signal, count-down pulse counting means connected to be responsive to said output pulses and providing an output indication of the count recorded therein, means coupled to said count-down counting means for storing a count therein corresponding to said predetermined amount of steel strip remaining on said pay-off reel, self-calibrating means coupled to be responsive to the speed of the entry roll and thereby the actual mill speed and providing a binary coded output indication thereof proportional to the square of the actual mill speed, binary comparison means connected to be responsive to the output indication of the count-down counting means and said binary coded output indication for generating a slow-down signal when said counter output reaches said binary coded output indication, and mill speed control means connected to be responsive to the slow-down signal for reducing the mill running speed by reducing the speed of said pay-off and take-up reels.

References Cited in the file of this patent
UNITED STATES PATENTS

| | | |
|---|---|---|
| 1,801,598 | Evans | Apr. 21, 1931 |
| 2,066,872 | Adams et al. | Jan. 5, 1937 |
| 2,137,611 | Hetler | Nov. 22, 1938 |
| 2,851,911 | Hessenberg | Sept. 16, 1958 |
| 2,852,195 | Coleman et al. | Sept. 16, 1958 |
| 2,968,451 | Schneider | Jan. 17, 1961 |
| 3,015,974 | Orbom et al. | Jan. 9, 1962 |